US008886007B2

(12) United States Patent
Chen et al.

(10) Patent No.: US 8,886,007 B2
(45) Date of Patent: *Nov. 11, 2014

(54) APPARATUS AND METHOD OF TRANSMITTING/RECEIVING MULTIMEDIA PLAYBACK ENHANCEMENT INFORMATION, VBI DATA, OR AUXILIARY DATA THROUGH DIGITAL TRANSMISSION MEANS SPECIFIED FOR MULTIMEDIA DATA TRANSMISSION

(75) Inventors: Kuan-Chou Chen, Hsinchu County (TW); Hua Wu, Hsinchu County (TW); Chih-Hao Hsiao, Taipei (TW); Chi-Chin Lien, Taipei (TW); Ting-Hsun Wei, Tainan (TW); Ching-Chieh Wang, Yilan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,246

(22) Filed: Aug. 22, 2012

(65) Prior Publication Data

US 2012/0314128 A1    Dec. 13, 2012

Related U.S. Application Data

(63) Continuation of application No. 12/143,852, filed on Jun. 23, 2008, now Pat. No. 8,275,232.

(51) Int. Cl.
| | |
|---|---|
| *H04N 5/76* | (2006.01) |
| *H04N 7/08* | (2006.01) |
| *H04N 7/088* | (2006.01) |
| *H04N 5/85* | (2006.01) |
| *G09G 5/00* | (2006.01) |

(52) U.S. Cl.
CPC .................. *H04N 5/76* (2013.01); *H04N 7/088* (2013.01); *G09G 2370/04* (2013.01); *H04N 5/85* (2013.01); *G09G 5/006* (2013.01); *H04N 7/08* (2013.01); *G09G 2370/12* (2013.01)
USPC .... 386/200; 348/554; 348/E7.004; 348/E7.026; 725/151

(58) Field of Classification Search
USPC ................. 386/95, E5.001; 348/554, E7.004, 348/E7.026; 725/151
See application file for complete search history.

(56) References Cited

U.S. PATENT DOCUMENTS

2005/0073608 A1 *  4/2005  Stone et al. .................... 348/468
2005/0243934 A1 * 11/2005  Werner et al. ............. 375/240.24

(Continued)

FOREIGN PATENT DOCUMENTS

| | | | | |
|---|---|---|---|---|
| FR | EP1819146 | * | 2/2007 | ............... H04N 5/00 |
| JP | 200346898 A | | 2/2003 | |

(Continued)

*Primary Examiner* — Hadi Armouche
*Assistant Examiner* — Hee Song
(74) *Attorney, Agent, or Firm* — Winston Hsu; Scott Margo

(57) ABSTRACT

A data transmission interface apparatus, communicating with another data transmission interface apparatus through a digital transmission means for transmitting multimedia data, includes a processor for processing multimedia data; and a data converting circuit, coupled to the processor, for converting a plurality of first multimedia data sets generated from the processor into a plurality of second multimedia data sets; and for converting a plurality of first auxiliary data sets into a plurality of second auxiliary data sets. The first auxiliary data set and the second auxiliary data set include closed caption information.

18 Claims, 3 Drawing Sheets

(56) References Cited

U.S. PATENT DOCUMENTS

2007/0011720 A1* 1/2007 Min .......................... 725/151
2008/0007616 A1* 1/2008 Baladhandayuthapani 348/14.12

FOREIGN PATENT DOCUMENTS

| WO | 2007008498 A2 | 1/2007 |
| WO | 2008056708 A1 | 5/2008 |

* cited by examiner

APPARATUS AND METHOD OF TRANSMITTING/RECEIVING MULTIMEDIA PLAYBACK ENHANCEMENT INFORMATION, VBI DATA, OR AUXILIARY DATA THROUGH DIGITAL TRANSMISSION MEANS SPECIFIED FOR MULTIMEDIA DATA TRANSMISSION

CROSS REFERENCE TO RELATED APPLICATIONS

This is a continuation application of co-pending U.S. patent application Ser. No. 12/143,852, filed on Jun. 23, 2008 and incorporated herein by reference.

BACKGROUND

The invention relates to transmitting/receiving data, and more particularly, to an apparatus of transmitting/receiving multimedia data through a high definition multimedia interface and related method thereof.

The vertical blanking interval (VBI) is a time interval defined between the last visible line of one frame/field and the beginning visible line of the next frame/field. During this time interval, the data that is transmitted is not displayed on the screen. Taking an analog television system for example, the vertical blanking interval can be used to carry extra information, i.e., VBI data. However, due to the requirements of high quality video display, advanced transmission interfaces are developed. For example, the high definition multimedia interface (HDMI) has been developed from digital visual interface (DVI), where DVI is commonly utilized for computer monitors and HDMI is utilized for digital consumer electronic products (e.g., digital TVs, DVD players, DVD recorders, set-top boxes, and other digital video and/or audio products). Generally speaking, the HDMI is a transmission interface utilized for the transmission of a high definition multimedia digital signal including high fidelity image and multi-channel audio signal. Some of the benefits of high definition multimedia interface may include, but are not limited to, uncompressed digital video and use of a single connector/cable only.

However, the currently defined HDMI specification version 1.3a fails to fully support the VBI data transmission. For example, the currently defined HDMI specification only supports transmitting the aspect ratio information during the non-active video period. Therefore, it would be beneficial to use the high definition multimedia interface for transmitting more auxiliary information, including additional VBI data (e.g., closed caption, CGMS-A, etc.).

SUMMARY

It is therefore one of the objectives of the claimed invention to provide an apparatus and method for transmitting/receiving auxiliary data, such as video playback enhancement information, audio playback enhancement information, VBI data, or accessory video display data through a high definition multimedia interface (HDMI).

According to a first aspect of the present invention, a data transmission interface apparatus, communicating with another data transmission interface apparatus through a digital transmission means for transmitting multimedia data, is disclosed. The data transmission interface apparatus includes: a processor, for processing multimedia data; and a data converting circuit, coupled to the processor, for converting a plurality of first multimedia data sets generated from the processor into a plurality of second multimedia data sets; and for converting a plurality of first auxiliary data sets into a plurality of second auxiliary data sets; wherein the first auxiliary data set and the second auxiliary data set include closed caption information.

According to a second aspect of the present invention, a transmitter is disclosed. The transmitter includes: a video processor, for selectively combining a plurality of multimedia data sets and a plurality of auxiliary data sets to generate a plurality of resultant video data sets, wherein the multimedia data sets correspond to a main video signal or a sub-picture video signal, and the auxiliary data sets correspond to accessory video display data; and a data converting circuit, coupled to the video processor, for converting the resultant video data sets into a plurality of converted multimedia data sets; wherein the converted multimedia data sets are outputted through a digital transmission means specified for multimedia data transmission, and the accessory video display data comprise closed caption information.

According to a third aspect of the present invention, a method for transmitting multimedia data is disclosed. The method includes following steps: (a) receiving video data sets and auxiliary data sets, wherein the auxiliary data sets comprise accessory video display data; (b) selectively combining accessory video display data with the video data sets so as to generate resultant video data sets; (c) converting the resultant video data sets into converted multimedia data sets; (d) converting the auxiliary data sets not combined with the video data sets in step (b) into converted auxiliary data sets; and (e) transmitting the converted multimedia data sets and the converted auxiliary data sets according to a digital transmission means; wherein the auxiliary data sets includes closed caption information.

According to a fourth aspect of the present invention, a data transmission interface apparatus, communicating with another data transmission interface apparatus through a digital transmission means for transmitting multimedia data, is disclosed. The data transmission interface apparatus includes: a processor, for processing multimedia data; and a data converting circuit, coupled to the processor, for converting a plurality of first multimedia data sets generated from the processor into a plurality of second multimedia data sets; and for converting a plurality of first auxiliary data sets into a plurality of second auxiliary data sets. The digital transmission means complies with a high definition multimedia interface (HDMI) specification, and the second auxiliary data sets are transmitted through transmission minimized differential signaling (TMDS) channels via an undefined packet having a packet type that is not defined in the HDMI specification version 1.3a with which the digital transmission means complies.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
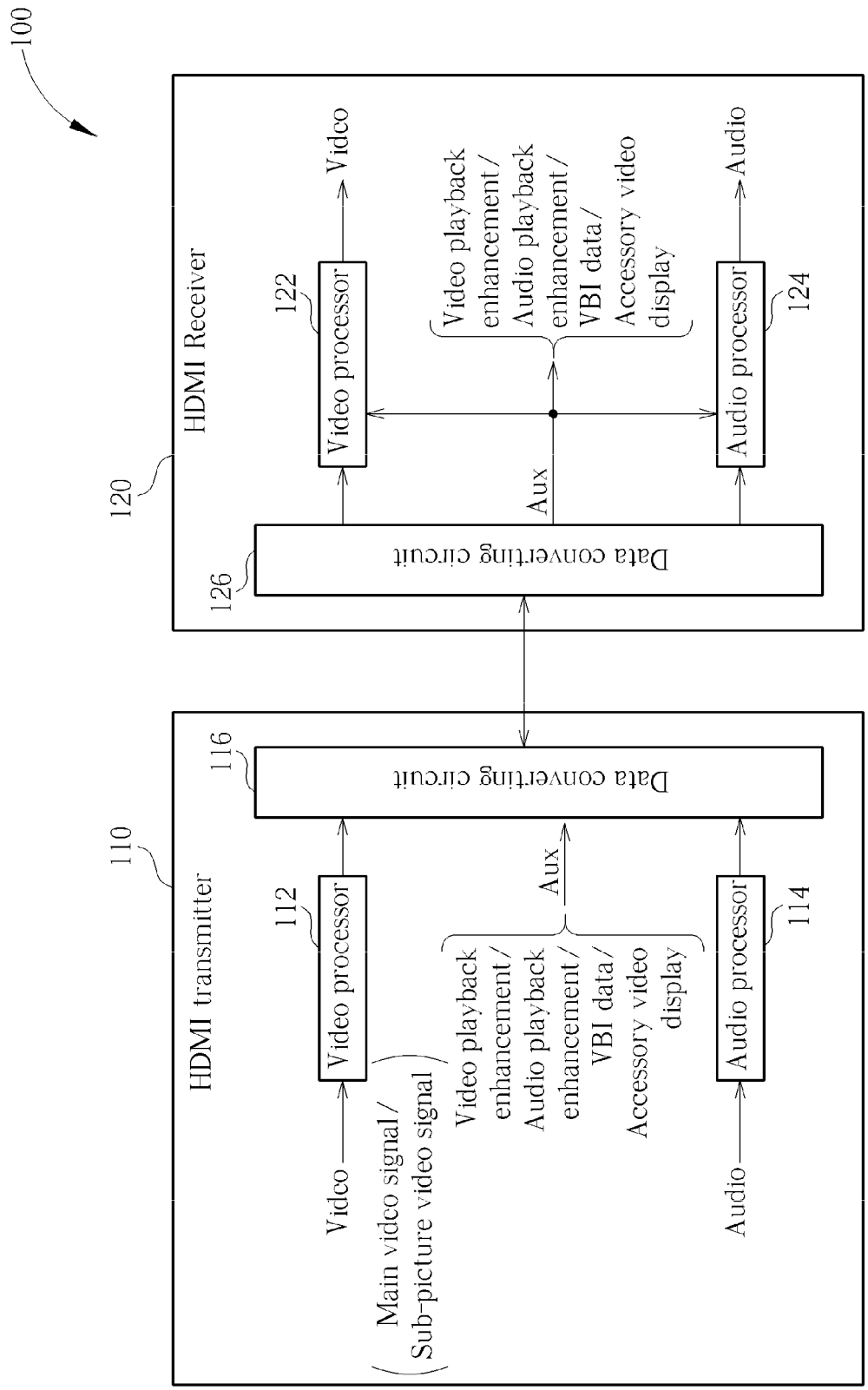
FIG. 1 is a block diagram illustrating an HDMI system according to an embodiment of the invention.

Please refer to FIG. 1. FIG. 1 is a block diagram illustrating an advanced transmission interface, for example an HDMI system 100, according to an embodiment of the invention. The HDMI system 100 may include a plurality of data transmission interface apparatuses, such as an HDMI transmitter 110 disposed at a source end (e.g., a DVD player, DVD recorder, set-top box, digital TV, or any electronic device equipped with an HDMI interface) and an HDMI receiver 120 disposed at a sink end (e.g., DVD recorder, set-top box, digital TV, or any electronic device equipped with an HDMI interface), where the HDMI transmitter 110 and the HDMI receiver 120 are connected through an HDMI cable. As shown in FIG. 1, the HDMI transmitter 110 includes a video processor 112 and an audio processor 114 for processing video data sets and audio data sets included in incoming multimedia data sets, respectively. It should be noted that the video data sets might include data sets correspond to a main video signal and/or data sets correspond to a sub-picture video signal, such as on-screen display (OSD). The outputs of the video processor 112 and the audio processor 114 (i.e., data sets to be transmitted by the HDMI transmitter 110) are delivered to a data converting circuit 116 implemented in the HDMI transmitter 110. The data converting circuit 116 is configured for converting data formats of incoming multimedia data sets (i.e., first multimedia data sets of the HDMI transmitter 110), including video data sets (corresponding to main video signal and/or sub-picture video signal) and audio data sets, into data formats specified by the HDMI specification for designated transmission means between the HDMI transmitter 110 and the HDMI receiver 120, thereby generating converted multimedia data sets (i.e., second multimedia data sets of the HDMI transmitter 110) including converted video data sets (corresponding to main video signal and/or sub-picture video signal) and converted audio data sets. Similarly, the data converting circuit 116 further converts data formats of incoming auxiliary data sets (i.e., first auxiliary data sets of the HDMI transmitter 110) into data formats specified by the HDMI specification for designated transmission means between the HDMI transmitter 110 and the HDMI receiver 120, thereby generating converted auxiliary data sets (i.e., second auxiliary data sets of the HDMI transmitter 110). As the data format conversion implemented for regulating data to be transmitted over transmission channels supported by the HDMI interface is well known to those skilled in the pertinent art, further description is omitted here for the sake of brevity. In the end, the converted multimedia data sets and the converted auxiliary data sets are transmitted from the HDMI transmitter 110 to the HDMI receiver 120 through the HDMI cable containing a plurality of physical transmission lines. In this embodiment, the data converting circuit 116 is configured to transmit the converted auxiliary data sets using digital transmission means defined by HDMI specification, such as transition minimized differential signaling (TMDS) channels, display data channels (DDCs), consumer electronics control (CEC) channels, or any available reserved channels.

The TMDS channel is defined to transmit information via packets. As known to those skilled in this art, the TMDS channel operates in one of three operation modes, including Video Data Period, Data Island Period, and Control period. In this embodiment, the converted auxiliary data sets may be transmitted by undefined new packet type, such as packet type value 0x86, 0x87, and the like, or reserved bit(s)/byte(s) of well-defined packets, such as PB6-PB27 of packet 0x84 and the like, during the aforementioned data island period. In another embodiment, the converted auxiliary data sets may be transmitted by the DDC channel. If the DDC channel is used for transmitting the converted auxiliary data sets, the data transfer is carried out by I2C protocol. Additionally, in another embodiment, the converted auxiliary data sets may be transmitted by the CEC channel. If the CEC channel is used for transmitting the converted auxiliary data sets, the data transfer is carried out by an opcode manner, where a "start code" is placed in the beginning of the desired data transmission, and an "End of Message (EOM)" is placed in the end of the desired data transmission. These are for illustrative purposes only, and are not meant to be limitations of the invention.

The exemplary auxiliary data sets supported by the data converting circuit 116 in the HDMI transmitter 110 are categorized and detailed as below:

1) Video Playback Enhancement Information a. Repeat First Field Flag

Referring to ISO/IEC 13818-2 6.3.10, this flag is used to indicate the number of display fields of the reconstructed frame. If the flag is set by '0', the frame consists of two fields, where the first field is followed by the other field. However, if the flag is set by '1', the frame consists of three fields, where the first field is followed by the other field, and then the first field is repeated. Also referring to progressive sequence, it can be used to benefit 3-2 pull down inverse telecine detection.

b. Progressive Sequence Information

If the representative data bit is set by '1', the coded video sequence contains only progressive frame pictures; however, if it is set by '0', the coded video sequence may contain both frame or field pictures, and frame picture may be progressive or interlaced. The progressive sequence information can benefit 2-2 pull down detection and improve chroma interpolation algorithm.

c. Progressive Frame Information

It indicates that two fields of reconstructed picture frame are from the same time instant if the representative data bit is set by '1' or different time instant if it is set by '0'. This helps 2-2 pull down detection and improves chroma interpolation algorithm.

d. Interlace Flag (mpeg4)

It indicates two fields of reconstructed picture frame are from the same time instant if the representative data bit is set by '0' or different time instant if it is set by '1'. This helps 2-2 pull down detection and improves chroma interpolation algorithm.

e. Motion/Still Information.

The information of motion video or still image (e.g., PEG, logo, slide show, etc.) is sent from the source end equipped with the HDMI transmitter 110 to help the de-interlacing processing of the sink end equipped with the HDMI receiver 120.

f. Top/Bottom Information

The top/bottom information is sent in progressive video formats. It indicates which field is the source video data, helping the sink end to do quality enhancement if it has high computing power.

g. Video Mute Command

The video mute command is sent to the sink end to turn off video or disable the video. In addition, the source end can use this command to do special purpose, e.g., changing the resolution.

2) VBI Data a. CGMS-A Information (Copy Generation Management System on Analog Video Interface)

It includes two bits set according to the following rules:
(0, 0) copying is permitted without restriction
(0, 1) condition not to be used/no more copies (one generation copy has been made)
(1, 0) one generation of copies may be made
(1, 1) no copying is permitted b. APS (Analog Protection System) Information It includes two bits set according to the following rules:
(0, 0) PSP (pseudo-sync pulse) off
(0, 1) PSP on, split burst off
(1, 0) PSP on, 2-line split burst on
(1, 1) PSP on, 4-line split burst on c. Closed Caption (Extended Data Service, XDS) Information Referring to EIA/CEA-608-B, an extended data service (XDS) mode is a third data service on field 2 (even filed) intended to supply program related and other information to the viewer.

d. V-Chip Information

It is a feature of television receivers. Using this function allows the blocking of programs based on their ratings category. Specifically, it is intended for use by parents to manage their children's television viewing.

e. Time Code Information

The vertical interval time code (VITC) is recorded during the vertical blanking interval of the video signal in both fields.

f. Teltext (VPS\PDC) Information

The program delivery control (PDC) is a system that controls VCR recording using teltext information. The PDC data indicates to the recorder when a show or program starts. There are two methods of transmitting PDC via teltext. One is placing the data on a viewable teltext page, and is usually transmitted on $16^{th}$ scan line, which is known as the video programming system (VPS). Another method is placing the data on a hidden packet ($26^{th}$ packet) in the teltext signal, which contains the data on each program, including channel, program data, and start time.

g. Gemstar Information

Using this function, the viewer can record desired cable TV programs by inputting specific codes through the remote control.

3) Audio Playback Enhancement Information a. Audio Equalizer Information

It is used to control the equalization applied to selected frequency bands of the audio output.

b. Bass Management Information

It is used to direct signal components in a low-frequency band, for example, from 20 Hz to 120 Hz to a subwoofer or large speaker for playback.

c. Dynamic Range Control Information

It is used to control the dynamic range associated with the audio playback to thereby increase or decrease the volume automatically.

d. Virtual Surround Information

It is used to control two speakers to provide the virtual surround effects for listeners.

e. Lyrics/Album Information

It is used for carrying lyrics information or album information to the sink end.

f. Audio Mute Command

The audio mute command is sent to the sink end to turn off audio or mute audio. The source end can use this command to do special purpose, e.g., changing audio sampling rate.

4) Accessory Video Display Data a. Closed Caption

It is for the hearing impaired people. Closed captioning and text are transmitted during the vertical blanking interval.

b. Teltext (Subtitling/Data Broadcasting)

Subtitling is similar to the closed captioning, where "open" subtitles are the insertion of text directly into the picture prior to transmission, and "closed" subtitles are transmitted separately from the picture. Data broadcasting may be used to transmit information to private receivers. For example, typical applications include real-time financial information, airport flight schedule for hotels and travel agents, passenger information for railroads, software upgrades, etc.

c. EPG

Electronic program guide is an on-screen guide to scheduled broadcast television programs, allowing a viewer to navigate, select, and discover program contents by time, title, channel, genre, etc., through using the remote control.

d. Channel Name

It is used to carry program title of a digital TV program.

In an exemplary embodiment of the invention, the data converting circuit 116 is designed to convert an auxiliary data set (i.e., a first auxiliary data set) into a corresponding converted auxiliary data set (i.e., a second auxiliary data set) when detecting that the auxiliary data set carries video playback enhancement information, audio playback enhancement information, VBI data, or accessory video display data mentioned above. Please note that the accessory video display data mentioned above may be displayed in combination with the video data sets including data sets corresponding to main video signal and sub-picture video signal.

Regarding the HDMI receiver 120, it contains a data converting circuit 126, a video processor 122, and an audio processor 124. The data converting circuit 126 in the HDMI receiver 120 performs an inverse operation of the data conversion performed by the data converting circuit 116 in the HDMI transmitter 110 to recover the data sets in original data formats. That is, the data converting circuit 126 is for receiving converted multimedia data sets and converted auxiliary data sets from the HDMI transmitter 110 through the HDMI cable. Next, the data converting circuit 126 processes the converted multimedia data sets (i.e., first multimedia data sets of the HDMI receiver 120) into corresponding multimedia data sets (i.e., second multimedia data sets of the HDMI receiver 120), including video data sets and audio data sets to the video processor 122 and the audio processor 124 respectively.

In addition, the data converting circuit 126 is further for processing the converted auxiliary data sets (i.e., first auxiliary data sets of the HDMI receiver 120) into corresponding auxiliary data sets (i.e., second auxiliary data sets of the HDMI receiver 120). In this embodiment, the data converting circuit 126 is designed to transfer a converted auxiliary data set into a corresponding auxiliary data set when receiving the converted auxiliary data set from the HDMI transmitter 110. Furthermore, in the exemplary embodiment, the auxiliary data sets generated from the data converting circuit 126 are further forwarded to the video processor 122 and the audio processor 124 to assist the data processing in the video processor 122 and the audio processor 124 as the auxiliary data sets could carry video playback enhancement information, audio playback enhancement information, VBI data, or accessory video display data mentioned above.

Figure 2:
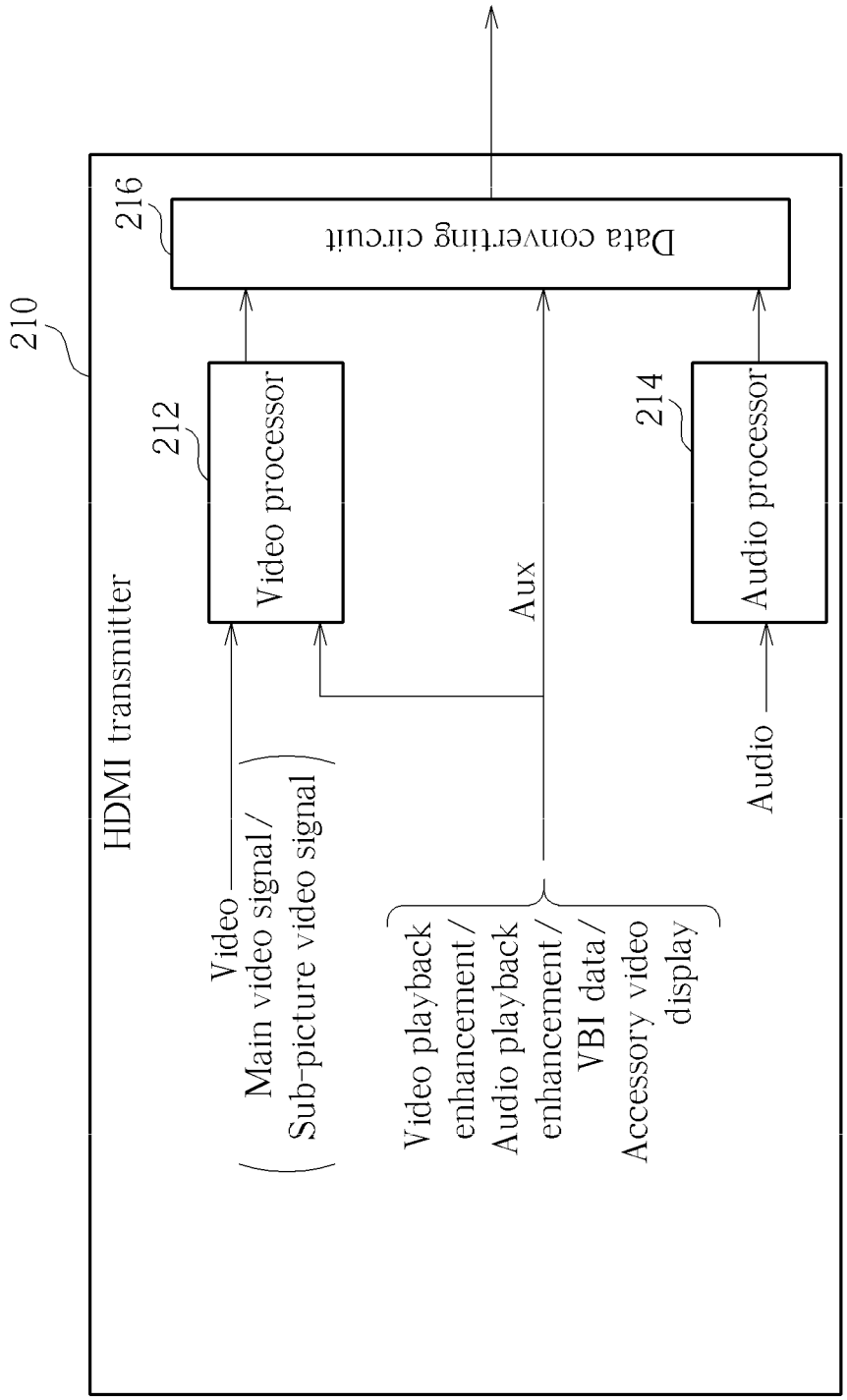
FIG. 2 is a diagram illustrating another HDMI transmitter according to an embodiment of the invention.

As the embodiment of this invention, in addition to the multimedia data sets including the video data sets and the audio data sets, the afore-mentioned accessory video display data are transmitted from the HDMI transmitter 110 to the HDMI receiver 120. In another embodiment of the invention, a pre-processing for the accessory video display data is implemented. Please refer to FIG. 2. FIG. 2 is a diagram illustrating another HDMI transmitter 210 according to an embodiment of the invention. The HDMI transmitter 210 includes a video processor 212, an audio processor 214, and a data converting circuit 216. The configuration of the HDMI transmitter 210 shown in FIG. 2 is similar to that of the HDMI transmitter 110 shown in FIG. 1. The major difference is that the video processor 212 could implement to combine the video data sets and accessory video display data, such as closed caption information, subtitling information, data broadcasting information, EPG information, or channel name information, to generate resultant video data sets. In one implementation, all of the accessory video display data sets, carrying closed caption information, subtitling information, data broadcasting information, EPG information, and channel name, are forwarded to the video processor 212 and then combined with the video data sets. The resultant video data sets may include data sets correspond to main video signal and accessory video display data correspond to the main video signal, and/or data sets correspond to sub-picture video signal and accessory video display data correspond to the sub-picture video signal. Next, the data converting circuit 216 converts the resultant video data sets, audio data sets, and auxiliary data sets into converted multimedia data sets. And then the data converting circuit 216 outputs the converted multimedia data sets to an HDMI receiver (not shown). In this embodiment, the accessory video display data serves as an OSD image data, and is combined with the video data sets by the video processor 212. However, this is not meant to be a limitation of the invention. Please note that the data converting circuit 216 shown in FIG. 2 is still capable of processing the other auxiliary data sets, including the video playback enhancement information, the audio playback enhancement information, and the VBI data to form converted auxiliary data sets.

In another embodiment of the invention, a portion of the accessory video display data, for example channel name or EPG, may be converted by the data converting circuit 216 to form converted accessory video display data included in the converted auxiliary data sets, while another portion of the accessory video display data, for example Close caption or Teltext, may be combined with video data sets by the video processor 212 to form resultant video data sets. Then, the resultant video data sets and audio data sets are converted into converted multimedia data sets. In other word, the accessory video display data can be transmitted independently or in combination with the video data sets, depending upon design requirements.

Figure 3:
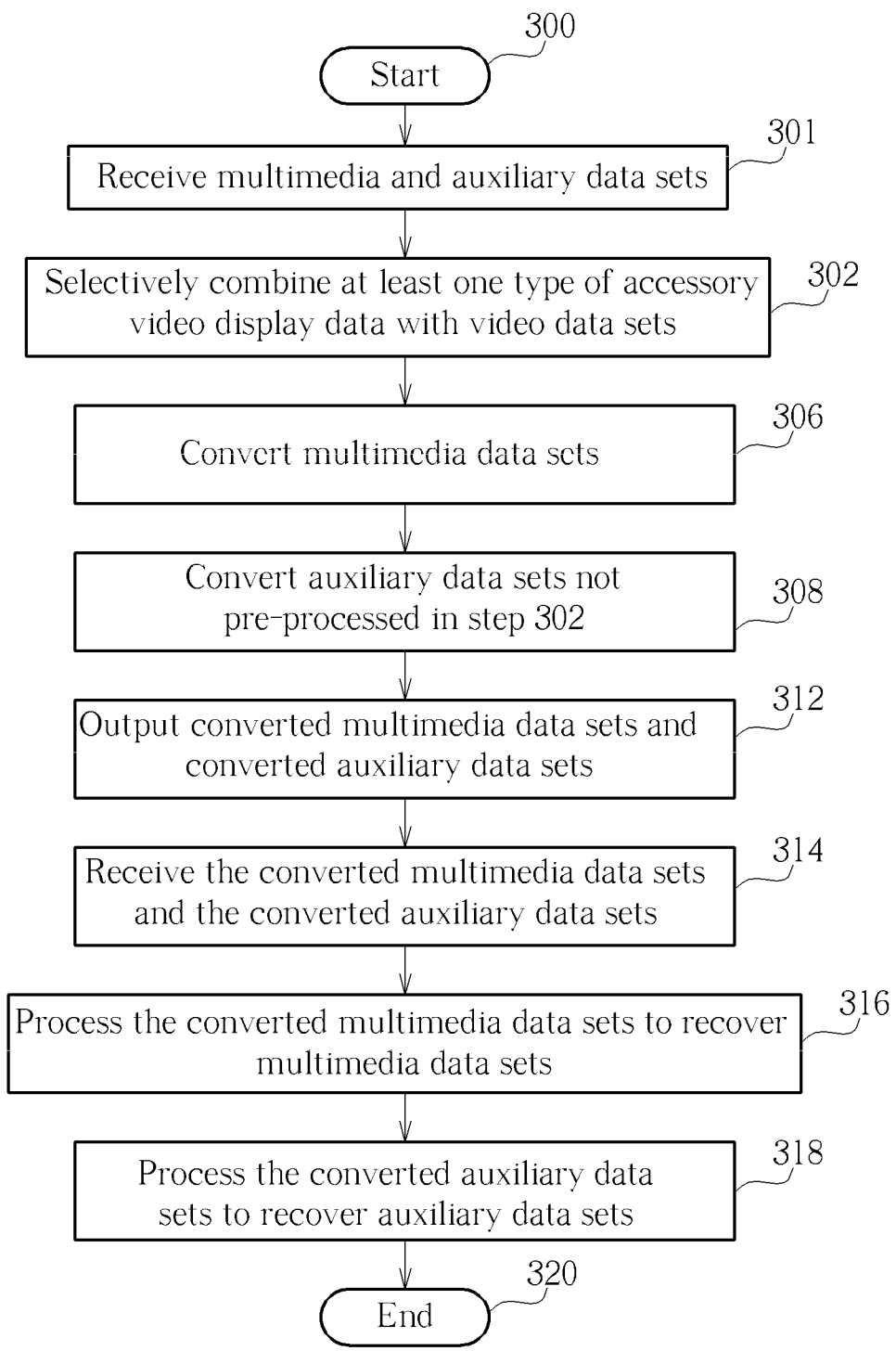
FIG. 3 is a flowchart illustrating a data transmitting method in conjunction with a data receiving method according to an embodiment of the invention.

Please refer to FIG. 3. FIG. 3 is a flowchart illustrating a data transmitting method in conjunction with a data receiving method according to an embodiment of the invention. Provided that the result is substantially the same, the steps are not limited to be executed in the exact order shown in FIG. 3. The exemplary flow includes following steps:

Step 300: Start.

Step 301: Receive a plurality of multimedia data sets (including video data sets and/or audio data sets) and a plurality of auxiliary data sets, wherein the auxiliary data sets include video playback enhancement information, audio playback enhancement information, VBI data, and/or accessory video display data.

Step 302: Selectively combine at least one type of the accessory video display data, such as closed caption information, subtitling information, data broadcasting information, EPG information, or channel name information, with the video data sets (e.g., video data sets for main video signal or sub-picture display) according to design requirements, so as to generate a resultant video data set.

Step 306: Convert multimedia data sets, including resultant video data sets and audio data sets, into a plurality of converted multimedia data sets.

Step 308: Convert the auxiliary data sets not pre-processed in step 302 into a plurality of converted auxiliary data sets.

Step 312: Output the converted multimedia data sets and the converted auxiliary data sets according to a digital transmission means specified for HDMI data transmission, such as TDMS channels, DDC channels, or CEC channels.

Step 314: Receive the converted multimedia data sets and the converted auxiliary data sets according to the digital transmission means specified for HDMI data transmission.

Step 316: Process the converted multimedia data sets to recover a plurality of multimedia data sets, including resultant video data sets and audio data sets.

Step 318: Process the converted auxiliary data sets to recover a plurality of auxiliary data sets.

Step 320: End.

Since the operations of the embodiments have been detailed above, a person skilled in this art can readily understand the flow details after reading the above disclosure. Further description is omitted here for the sake of brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission interface apparatus, communicating with another data transmission interface apparatus through a digital transmission means for transmitting multimedia data, the data transmission interface apparatus comprising:
   a processor, for processing multimedia data; and
   a data converting circuit, coupled to the processor, for converting a plurality of first multimedia data sets generated from the processor into a plurality of second multimedia data sets; and for converting a plurality of first auxiliary data sets into a plurality of second auxiliary data sets;
   wherein the first auxiliary data set and the second auxiliary data set include closed caption information;
   wherein the digital transmission means complying with an HDMI specification is selected from a group consisting of TMDS channels, display data channel, and consumer electronics control channel.

2. The data transmission interface apparatus of claim 1, wherein the first auxiliary data set and the second auxiliary data set comprise video playback enhancement information selected from a group consisting of a repeat first field flag, progressive sequence information, progressive frame information, an interlace flag, motion/still information, top/bottom information, and a video mute command.

3. The data transmission interface apparatus of claim 1, wherein the first auxiliary data set and the second auxiliary data set comprise audio playback enhancement information selected from a group consisting of audio equalizer information, bass management information, dynamic range control information, virtual surround information, lyrics information, album information, and an audio mute command.

4. The data transmission interface apparatus of claim 1, wherein the first auxiliary data set and the second auxiliary data set comprise VBI data selected from a group consisting of CGMS-A information, APS information, XDS information, Gemstar information, V-chip information, time code information, and PDC information.

5. The data transmission interface apparatus of claim 1, wherein the first auxiliary data set and the second auxiliary data set include video information selected from a group consisting of subtitling information, data broadcasting information, EPG information, and channel name information.

6. The data transmission interface apparatus of claim 1, wherein the second auxiliary data sets are transmitted through the TMDS channels via an undefined packet or via a reserved bit of well-defined packet.

7. The data transmission interface apparatus of claim 1, wherein the second auxiliary data sets are transmitted through the display data channel or the consumer electronics control channel.

8. A transmitter, comprising:
a video processor, for selectively combining a plurality of multimedia data sets and a plurality of auxiliary data sets to generate a plurality of resultant video data sets, wherein the multimedia data sets correspond to a main video signal or a sub-picture video signal, and the auxiliary data sets correspond to accessory video display data; and
a data converting circuit, coupled to the video processor, for converting the resultant video data sets into a plurality of converted multimedia data sets;
wherein the converted multimedia data sets are outputted through a digital transmission means specified for multimedia data transmission, and the accessory video display data comprise closed caption information;
wherein the digital transmission means complying with an HDMI specification comprise TMDS channels.

9. The transmitter of claim 8, wherein the accessory video display data is selected from a group consisting of subtitling information, data broadcasting information, EPG information, and channel name information.

10. A method for transmitting multimedia data, the method comprising the following steps:
(a) receiving video data sets and auxiliary data sets, wherein the auxiliary data sets comprise accessory video display data;
(b) selectively combining accessory video display data with the video data sets so as to generate resultant video data sets;
(c) converting the resultant video data sets into converted multimedia data sets;
(d) converting the auxiliary data sets not combined with the video data sets in step (b) into converted auxiliary data sets; and
(e) transmitting the converted multimedia data sets and the converted auxiliary data sets according to a digital transmission means;
wherein the auxiliary data sets includes closed caption information;
wherein the digital transmission means complying with an HDMI specification is selected from a group consisting of TMDS channels, display data channel, and consumer electronics control channel.

11. The method of claim 10, wherein the converted auxiliary data sets are transmitted through the TMDS channels via an undefined packet or a reserved bit of well-defined packet.

12. The method of claim 10, wherein the converted auxiliary data sets are transmitted through the display data channel or the consumer electronics control channel.

13. A data transmission interface apparatus, communicating with another data transmission interface apparatus through a digital transmission means for transmitting multimedia data, the data transmission interface apparatus comprising:
a processor, for processing multimedia data; and
a data converting circuit, coupled to the processor, for converting a plurality of first multimedia data sets generated from the processor into a plurality of second multimedia data sets; and for converting a plurality of first auxiliary data sets into a plurality of second auxiliary data sets;
wherein the digital transmission means complies with a high definition multimedia interface (HDMI) specification, and the second auxiliary data sets are transmitted through transmission minimized differential signaling (TMDS) channels via an undefined packet having a packet type that is not defined in the HDMI specification version 1.3a with which the digital transmission means complies.

14. The data transmission interface apparatus of claim 13, wherein each of the first auxiliary data sets and the second auxiliary data sets comprises at least one of video playback enhancement information, audio playback enhancement information, vertical blanking interval (VBI) data, and video information.

15. The data transmission interface apparatus of claim 14, wherein the video playback enhancement information is selected from a group consisting of a repeat first field flag, progressive sequence information, progressive frame information, an interlace flag, motion/still information, top/bottom information, and a video mute command.

16. The data transmission interface apparatus of claim 14, wherein the audio playback enhancement information is selected from a group consisting of audio equalizer information, bass management information, dynamic range control information, virtual surround information, lyrics information, album information, and an audio mute command.

17. The data transmission interface apparatus of claim 14, wherein the VBI data is selected from a group consisting of CGMS-A information, APS information, XDS information, Gemstar information, V-chip information, time code information, and PDC information.

18. The data transmission interface apparatus of claim 14, wherein the video information is selected from a group consisting of closed caption information, subtitling information, data broadcasting information, EPG information, and channel name information.

* * * * *